US 6,724,122 B2

(12) United States Patent
Frey et al.

(10) Patent No.: US 6,724,122 B2
(45) Date of Patent: Apr. 20, 2004

(54) COVER PLATE FOR AN ELECTRIC MOTOR AND AN ELECTRIC MOTOR

(75) Inventors: Ronald Frey, Bönnigheim (DE); Harald Schmidt, Zaberfeld (DE); Johannes Helmich, Wertheim (DE); Werner Baeskow, Hessigheim (DE)

(73) Assignee: Valeo Motoren und Aktuatoren GmbH (DE)

( * ) Notice: Subject to any disclaimer, the term of this patent is extended or adjusted under 35 U.S.C. 154(b) by 0 days.

(21) Appl. No.: 10/318,974

(22) Filed: Dec. 12, 2002

(65) Prior Publication Data

US 2003/0107293 A1 Jun. 12, 2003

(30) Foreign Application Priority Data

Dec. 12, 2001 (DE) .......................................... 101 60 845

(51) Int. Cl.[7] ................................................ H01R 38/39
(52) U.S. Cl. .................... 310/238; 310/239; 310/68 R; 324/545
(58) Field of Search ............................. 310/239, 68 R; 324/545

(56) References Cited

U.S. PATENT DOCUMENTS

| 4,396,850 | A | | 8/1983 | Herr |
| 4,404,488 | A | | 9/1983 | Herr |
| 5,089,735 | A | * | 2/1992 | Sawaguchi ................... 310/88 |
| 6,060,802 | A | * | 5/2000 | Masegi ......................... 310/68 |
| 6,201,326 | B1 | * | 3/2001 | Klappenbach ............ 310/75 R |

FOREIGN PATENT DOCUMENTS

DE    42 43 137    8/1994

* cited by examiner

*Primary Examiner*—Nicholas Ponomarenko
*Assistant Examiner*—Iraj A. Mohandesi
(74) *Attorney, Agent, or Firm*—J. Gordon Lewis

(57) ABSTRACT

A cover plate for an electric motor which has a brush array and interference suppression devices has additional electronic components mounted directly on the cover to determine the speed of the electric motor and for diagnosis. Contact with the interference suppression devices and the additional electronic components is achieved through electrical conductors which are located directly on the cover plate. Flexible use of the electric motor is ensured through the high temperature stability of the cover plate.

20 Claims, 3 Drawing Sheets

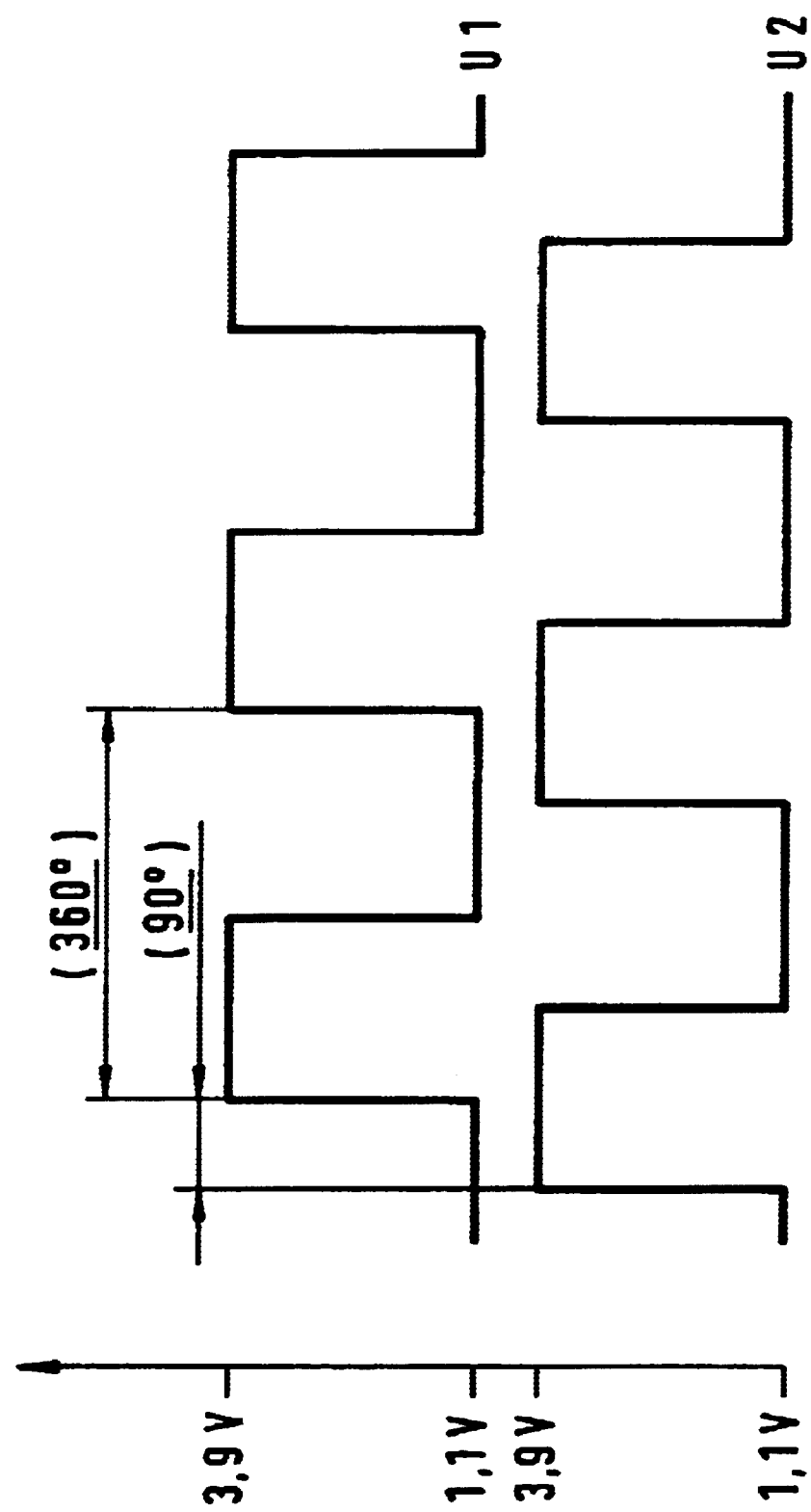

COVER PLATE FOR AN ELECTRIC MOTOR AND AN ELECTRIC MOTOR

BACKGROUND

The present invention relates to a cover plate for an electric motor having a brush array and interference suppression devices.

Traditional cover plates consist of synthetic material and act as chassis for the brush array of the electric motor, which has, for example, carbon brushes and carbon holders to locate the carbon brushes. Normally, interference suppression devices, such as coils or capacitors for example, are also mounted directly on the cover plate.

A great disadvantage of known cover plates is that they are designed only for a temperature range of up to a maximum of about 120° C. Since known systems do not provide for any monitoring of the cover plate temperature, it is not possible to fully exploit the output potential of the electric motor without the risk of exceeding the maximum permissible temperature for the cover plate.

A further disadvantage of known systems is that electronic components for evaluating motor speed and the like are mounted on a separate board, which has to be connected to the cover plate in an additional production step during manufacture.

The object of the present invention is to create an improved cover plate for an electric motor by avoiding the disadvantages of the prior art just detailed and thus to provide an improved electric motor.

SUMMARY

In the case of a cover plate for an electric motor with a brush array, this object is achieved under the invention by mounting additional electronic components directly on and/or integrating them into the cover plate. This simplifies the manufacturing process in particular.

A particularly advantageous aspect of the present invention is characterized in that electrical conductors which make contact with the brush array and/or the interference suppression devices are mounted directly on the cover plate and/or are integrated into the cover plate, whereby a separate connection of the brush array or the interference suppression devices to each other, or with additional electrical components using wires as required, is no longer necessary.

Interference suppression devices can be attached to the cover plate using hollow rivets which are welded to the connections of the interference suppression devices and are connected in an electrically conductive manner to the corresponding electrical conductors of the cover plate.

It is also advantageous to position electrical conductors to make contact with the additional electrical components directly on the cover plate, so that no plug or wire connections are needed to connect the additional electrical components.

It is also conceivable to integrate at least parts of the electrical conductors into a injection-molded circuit board.

A particularly advantageous aspect of the present invention is characterized in that at least one encoder to determine the speed of the electric motor is mounted directly on the cover plate. The encoder or encoders is/are preferably configured as Hall effect generators.

It is also very advantageous to mount two encoders on the cover plate. With a particular alignment of the two encoders relative to each other and to a magnetized trigger wheel connected to the armature shaft of the electric motor, it is possible to determine the direction of rotation of the electric motor from a phase shift of the output signals from the two encoders.

Because of the common arrangement of the encoders on the cover plate there is only minimal assembly expense involved in mounting the encoders in the correct position relative to the trigger wheel.

Another advantageous aspect of the cover plate under the invention is characterized in that a diagnostic circuit is mounted directly on the cover plate. In a particularly advantageous version, the diagnostic circuit has at least one preferably ohmic voltage divider, where a first node of the voltage divider is connected to a first reference potential in the diagnostic circuit, and a second node of the voltage divider is connected to a second reference potential in the diagnostic circuit.

Preferably the voltage divider consists of three ohmic resistors connected in series. Each of the two outer nodes of the voltage divider is connected to different reference potentials in the diagnostic circuit, so that the difference between the two reference potentials drops over the voltage divider.

A signal output of an encoder is connected to a third node of the voltage divider, and finally a signal line is connected to a fourth node of the voltage divider, so that, depending on the potential at the signal output of the encoders, different potentials are present at the fourth node of the voltage divider and thus at the signal line.

This circuitry makes it possible to detect short circuits in the signal output from the encoder, and other components, to the reference potential of the supply voltage of the additional electronic components and to the ground reference potential. Faulty wiring during manufacture or short circuits which only become apparent during operation can be detected easily, by evaluating the signal from the signal line.

A further, quite particularly advantageous aspect of the cover plate of the invention is characterized in that a temperature sensor is mounted directly on the cover plate, which makes it possible to measure the temperature of the cover plate during operation. Operating reliability and the life of the electric motor are substantially increased by monitoring the temperature of the cover plate in this way. For example, depending on a signal from the temperature sensor, it is possible to activate the electric motor directly, or to turn it off when a pre-set maximum temperature for the cover plate is exceeded, or to operate it at reduced output.

BRIEF DESCRIPTION OF THE DRAWING

Additional features, potential applications and advantages of the invention can be found in the description to follow of embodiments of the invention, which are shown in the figures of the drawing. All features described or depicted constitute individually or in any combination the subject of the invention, independently of their summation in the patent claims or their reference, and independently of their formulation or representation in the description or the drawing, respectively.

FIG. 1b is a side view of the cover plate from FIG. 1a;

FIG. 1c is the underside view of the cover plate from FIG. 1a;

FIG. 1d is a perspective view of the cover plate from FIG. 1a with two Hall generators 3;

FIG. 2a is a graph of the time sequence of two output signals.

DETAILED DESCRIPTION

Figure 1A:
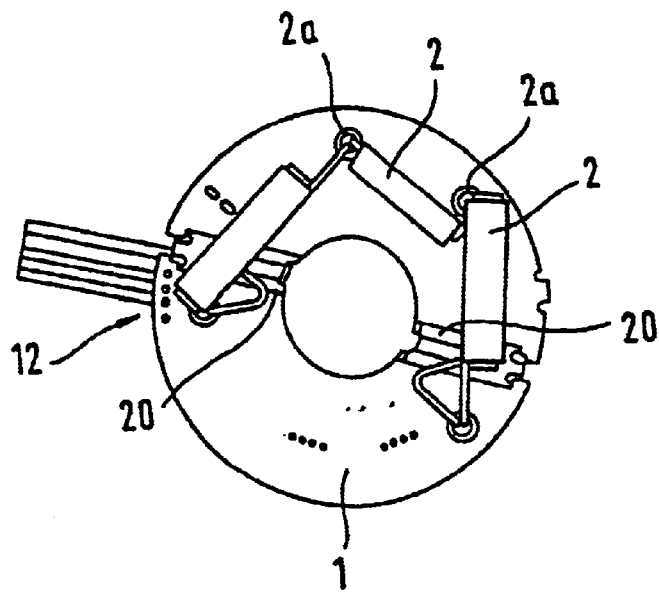
FIG. 1a is a plan view of the cover plate of the invention.
Figure 1B:
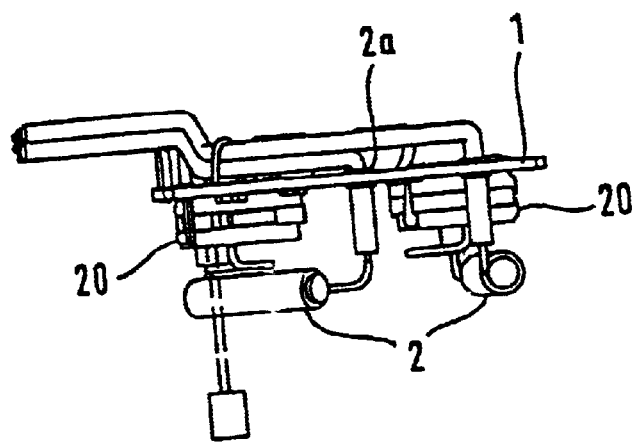

FIG. 1a depicts a cover plate 1 of the invention for an electric motor (not shown), on which several interference suppression devices 2 are mounted. The interference suppression devices 2 serve to reduce the emitted electromagnetic interference originating in the commutation processes in the electric motor and are configured as coils and capacitors.

The interference suppression devices 2 are fastened to the cover plate 1 with hollow rivets 2a and welded in the hollow rivets 2a. To make contact with additional interference suppression devices 2, configured for example as capacitors, electrical conductors (not shown) mounted directly on the cover plate 1 in the area of the hollow rivets 2a, or electrical conductors (not shown) integrated into the cover plate, are provided, which are connected in an electrically conductive manner with the hollow rivets 2a.

In addition to the interference suppression devices 2, a brush array is provided on the cover plate 1. The brush array has two carbon brush holders 20, each of which can hold a carbon brush (not shown). The carbon brush is pressed against the commutator of the electric motor by a pressure spring located in the carbon brush holder 20.

Figures 1C, 1D:
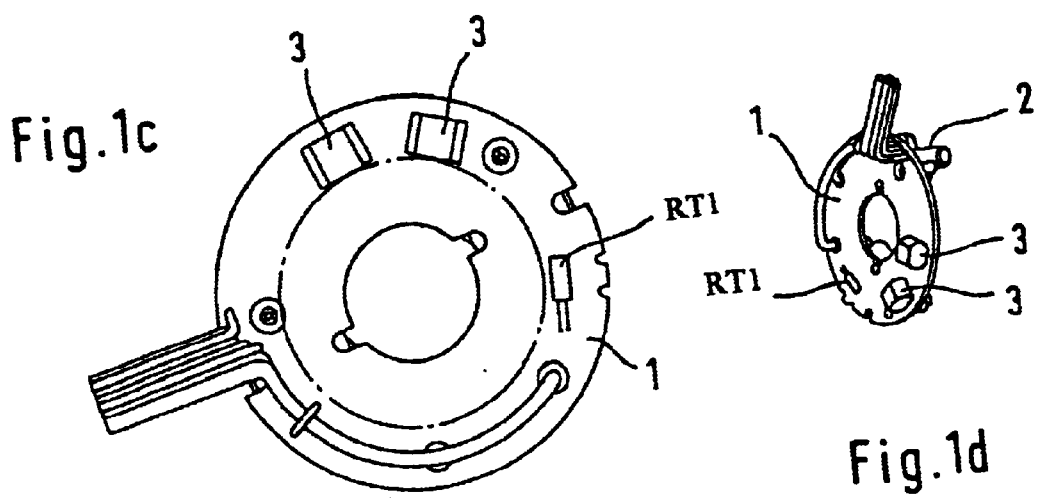

As can be seen from FIG. 1c, two encoders, preferably Hall generators, 3 are mounted on the underside of the cover plate 1. The Hall generators 3 are mounted directly on the cover plate 1 and fastened immovably to it. In addition, the electrical connections of the Hall effect generators 3, which contain an IC, are connected to electrical conductors (not shown) which are mounted directly on the cover plate 1 or integrated into the cover plate 1. The electrical conductors connect the Hall generators 3 to other electronic components on the cover plate and with a six-pin terminal block 12 (FIG. 1a).

The terminal block 12 allows for easy assembly of the cover plate 1 and a wiring harness, one of whose functions is to take signals from the Hall generators 3 to separate assemblies.

A trigger wheel solidly mounted on the armature (not shown) of the electric motor causes a chronological change in the magnetic flux density in the area of the Hall generators 3, which acts as an input signal for the Hall generators 3. A square-wave output signal, whose frequency is proportional to the speed of the electric motor, is generated for signal processing from this input signal by the Hall generators 3, or rather by the integrated circuit in the Hall generators.

Figure 2:
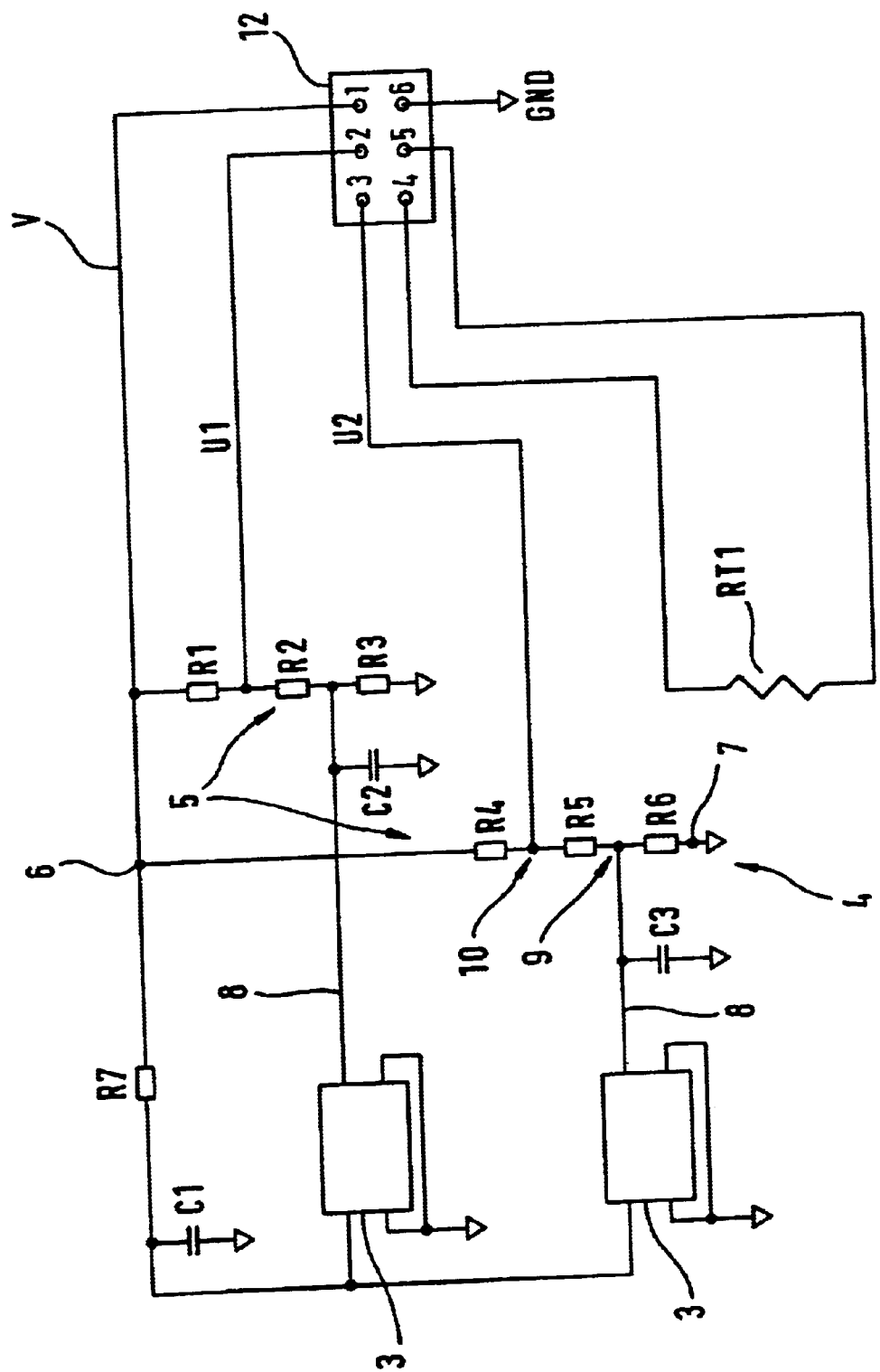
FIG. 2 is a circuit diagram of the additional electronic components.

As can be seen from the circuit diagram in FIG. 2, the output signal present at a signal output 8 of the encoder 3 is taken to a voltage divider 5, which has three ohmic resistors R1, R2, R3, or R4, R5, R6 respectively, connected in series. A separate voltage divider 5 is provided for each of the two encoders 3. Both voltage dividers 5 together are identified as diagnostic circuit 4 and, just like the two encoders 3, are mounted directly on the cover plate 1.

The electrical contact for the diagnostic circuit 4 in accordance with the circuit diagram in FIG. 2 is realized through electrical conductors which are mounted directly on the cover plate 1 and connect the components of the diagnostic circuit 4 to other electronic components, such as the encoders 3, for example.

As can be seen from FIG. 2, a first node 6 of the voltage divider 5 is connected to the supply voltage V of the circuit from FIG. 2 as the first reference potential. The supply voltage V is 5V. A second node 7 of the voltage divider 5 is connected to the ground reference potential GND in the circuit shown, that is, a differential in potential of 5V between the supply voltage and the ground reference potential is present at the voltage divider 5.

The signal output 8 of an encoder 3 is connected to a third node 9 of the voltage divider 5, and a first signal line U1 is connected to a fourth node 10 of the voltage divider 5. In the same way, a second signal line U2 is connected to the corresponding node 10 of the second voltage divider 5.

Both encoders 3 are positioned on the cover plate 1 relative to each other and to the trigger wheel in such a way that the rotational direction of the electric motor can be determined from a phase shift between their output signals.

FIG. 2a shows the waveform of the signals U1, U2, which depend on the output signals from the two encoders in a way still to be described, and show a phase shift of 90° to each other. From the information as to which of the two signals U1, U2 first has a leading/trailing edge, the rotational direction of the electric motor can be determined.

In normal operation, a square wave signal with the levels 0V corresponding to logical 0 or 5V corresponding to logical 1 is present at a signal output 8 of an encoder 3. These levels are converted by the voltage divider 5, and specifically, as can be seen from FIG. 2a, to the values of 1.1V corresponding to logical 0 or 3.9V corresponding to logical 1, whereby signals U1 and U2 are defined.

Depending on the internal circuitry of the signal output 8 of an encoder 3, the diagnostic circuit 4 makes it possible to detect a short circuit in the signal output 8, including to the supply voltage "V" and to ground "GND". In the event of a failure of this kind, the appropriate signal U1/U2 assumes a value different from the levels specified for normal operation. The levels in each case can be adjusted through the choice of the ohmic resistors R1 to R6.

An additional element in the circuit in FIG. 2 is the temperature sensor RT1, which is mounted directly on the cover plate 1 and reads the temperature of the cover plate 1, or the of electric motor, respectively. According to the circuit diagram, the connections for the temperature sensor RT1 are taken directly to the terminal block 12, which is realised through electrical conductors located directly on the cover plate.

It is expedient for precise monitoring of temperature if the temperature sensor RT1 is in good thermal contact with the cover plate 1. The temperature sensor is a PT1000 type sensor.

It is possible to switch the electric motor off as soon as a specifiable maximum temperature for the cover plate 1 is reached. Alternatively, by activating the electric motor by means of pulse-width modulation (PWM), the duty cycle of the PWM-signal can also be adjusted directly depending on the temperature detected by the temperature sensor RT1, in order to implement temperature-dependent output control of the electric motor.

Temperature stability of the cover plate together with the additional electronic components at more than 160° C. is particularly advantageous for universal use of the electric motor. Monitoring temperature by means of temperature sensor RT1 allows the operating point of the electric motor to be selected by exploiting the high temperature stability of the cover plate 1 along with the electronic components, so that the temperature of the cover plate 1 simply does not exceed a specifiable maximum value of, for example, 150° C., which permits optimal utilization of the output of the electric motor. Traditional systems without temperature monitoring are, by comparison, severely limited in their performance and flexibility because, when observing an acceptable maximum temperature for the cover plate or for the electric motor, they can always only be activated in such a way that under unfavorable circumstances, such as elevated ambient temperature, the maximum temperature is not exceeded under any circumstance.

The capacitors C2, C3 act as protection for the signal outputs 8 of the encoders 3. The low-pass filter formed by the ohmic resistor R7 and the capacitor C1 protects the encoders 3 from alternating components in supply voltage V. At the same time, input current control for the encoders 3 is achieved on the supply voltage side with R7.

What is claimed is:

1. A cover plate for an electric motor, comprising:

a brush array;

at least one interference suppression device; and at least one additional electronic component is earned on the cover plate, the at least one additional electronic component including temperature-sensitive means for providing a temperature-dependant signal for pulse-width modulated control of the electric motor.

2. The cover plate from claim 1, wherein electrical conductors for contacting at least one of the brush array the at least one interference suppression device are one of mounted directly on and integrated into the cover plate.

3. The cover plate of claim 1, wherein electrical conductors for contacting the at least one additional electronic component are carried on the cover plate.

4. The cover plate of claim 1, wherein at least one encoder for determining the speed of the electric motor is carried on the cover plate.

5. The cover plate of claim 4, wherein the at least one encoder is configured as a Hall generator.

6. The cover plate of claim 4, wherein the at least one encoder is mounted so that output signals from the encoder have a phase shift, from which the rotational direction of the electric motor can be determined.

7. A cover plate for an electric motor, comprising:

a brush array;

at least one interference suppression device; and at least one additional electronic component carried on the cover plate; wherein the at least one additional electronic component forms a diagnostic circuit.

8. A cover plate for an electric motor, comprising:

a brush array;

at least one interference suppression device; and at least one additional electronic component carried on the cover plate; wherein the at least one additional electronic component forms a diagnostic circuit; and wherein the diagnostic circuit has at least one voltage divider, where a first node of the voltage divider is connected to a first reference potential in the diagnostic circuit, and a second node of the voltage divider is connected to a second reference potential of the diagnostic circuit.

9. The cover plate of claim 8, wherein a signal output from an encoder is connected to a third node of the voltage divider, and wherein a signal line is connected to a fourth node of the voltage divider.

10. The cover plate of claim 7, wherein a temperature sensor is carried on the cover plate.

11. The cover plate of claim 1, wherein the temperature stability of the cover plate with the at least one additional electronic component is higher than 160° C.

12. The cover plate of claim 10, wherein a signal from the temperature sensor is adapted for activating an electric motor.

13. An electric motor having a cover plate according to claim 1.

14. An electric motor having a cover plate according to claim 7.

15. The cover plate of claim 7, wherein the temperature stability of the cover plate with the at least one additional electronic component is higher than 160° C.

16. The cover plate of claim 7, wherein at least one encoder for determining the speed of the electric motor is carried on the cover plate.

17. The cover plate of claim 16, wherein the at least one encoder is configured as a Hall generator.

18. The cover plate according to claim 1 wherein the temperature-sensitive means comprises a thermistor.

19. The cover plate according to claim 1, further comprising:

a diagnostic circuit for detecting a short circuit in a signal output of an encoder carried on the cover plate.

20. The cover plate according to claim 19 wherein the encoder configured as a Hall generator.

* * * * *